May 20, 1941.  G. R. GODBER  2,242,672
BATTERY CELL COVER
Filed May 6, 1940
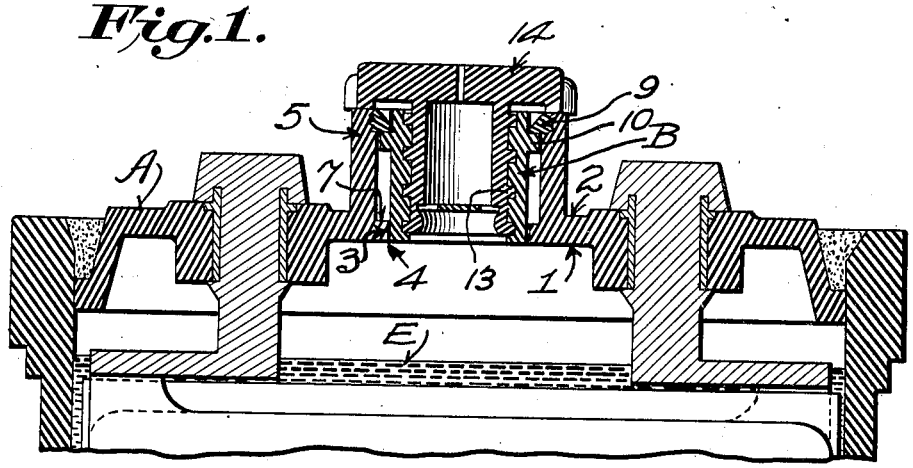
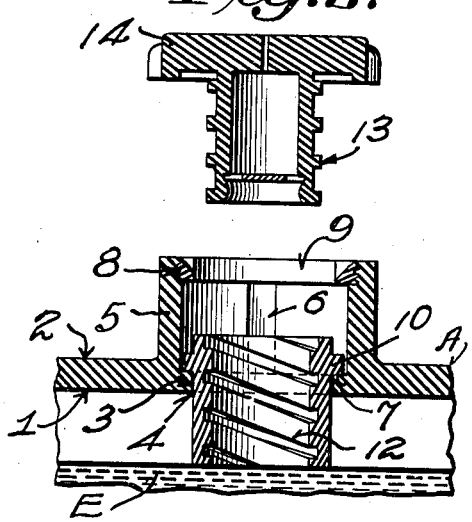
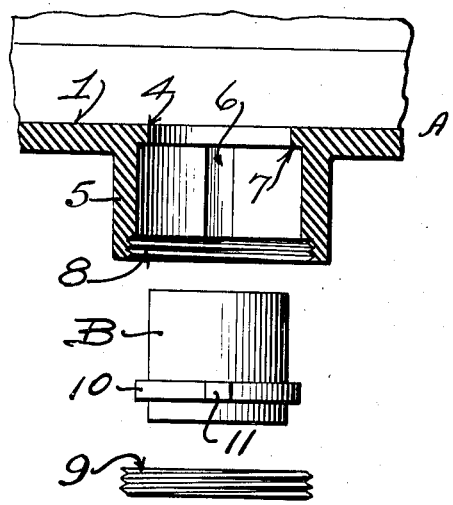
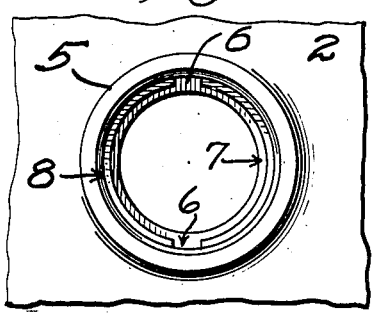
Inventor
George R. Godber,
By Welchauster & Groff
Attorneys Patented May 20, 1941

2,242,672

UNITED STATES PATENT OFFICE 2,242,672

BATTERY CELL COVER

George R. Godber, Los Angeles, Calif.

Application May 6, 1940, Serial No. 333,676

2 Claims. (Cl. 136—178)

This invention relates to electric storage batteries, and more particularly to improvements in the construction of the cell cover which facilitates the initial filling and draining of the battery with weak electrolyte during manufacture and also insures the proper level of the usual charge of electrolyte for service use.

Accordingly, in its primary aspect, the invention contemplates a construction which has a two-fold objective, namely, a decided advantage in handling storage batteries during process of manufacture and subsequently insuring proper maintenance. Most battery plants today use what is called "sealed formation" in forming the raw battery plates or charging the batteries. This procedure involves completing the battery including the cell cover before any electrolyte or acid is put over the plates. After the battery is completed, a weak electrolyte is put in the battery to constitute what is called the formation charge after which the battery has to have this weak solution dumped out by turning the battery upside down to drain. Thereafter, a stronger solution is put in the battery cells to make the battery fit for operating service. If the inner edge of the filling opening of the cell cover is surrounded by an inwardly projecting ring, annular abutment, or collar, or is obstructed by the inner end of the air trapping sleeve, it will be impossible for the initial weak solution to be completely drained from the cell. The present invention therefore has in view the elimination of any obstruction at the inside of the cover adjacent the filling opening which would provide a pocket and prevent complete drainage of the cell contents. In that connection, the invention contemplates making the inner edge of the filling opening of the cell flush with the inner face of the cell cover and also provide means for readily removing the sleeve. That is to say, in addition to providing a smooth unobstructed surface at the inside of the cell cover, it is also proposed to use a detachable sleeve which can be entirely removed from the opening and yet when installed in the cell cover for final assembly and use, may be shiftably controlled by a vented filler cap. This vented filler cap preferably includes a shank which operatively engages and controls the sliding movement of the sleeve when the parts are assembled in final usable position. When the sleeve is in its lowered position, it traps air in the top of the cell to insure the proper electrolyte level in the cell while the battery is in service, and, on the other hand, when the sleeve is elevated after the filler cap has been replaced on the cell cover, the sleeve is retracted to such a position that the air space above the electrolyte has ready access to the vented filler cap in such a way as to permit gases to freely escape and avoid overheating.

A further object of the invention is to provide a cell cover construction wherein the sleeve which cooperates with the vented filler cap has an abutment near one end which cooperates with spaced abutments within a collar whose outer end forms the seat for the head of the vented filler cap. The outer spaced abutment in the collar is preferably in the form of a ring detachably fitted to the collar in such a way as to facilitate assembly of the sleeve and simplify manufacturing operations. This feature also makes it possible to remove the sleeve during the draining of the weak electrolyte and permits of its ready replacement to regulate the level of the normal charge.

With the above and other objects in view, which will more readily appear as the nature of the invention is better understood, the same consists in the novel construction, combination and arrangement of parts hereinafter more fully described, illustrated and claimed.

A preferred and practical embodiment of the invention is shown in the accompanying drawing, in which:

Fig. 1 is a vertical sectional view of a battery cell cover embodying the present improvement showing the vented cap in the position of normal use and when the battery is being charged.

Fig. 2 is a detail sectional view showing the vented filler cap removed and the sleeve in lowered position to trap air in the top of the cell and properly gauge the electrolyte level.

Fig. 3 is a top plan view of the filling collar and opening with the vented cap, the detachable ring, and the gauging sleeve removed.

Fig. 4 is a vertical sectional view showing the cell cover inverted with the detachable abutment and gauging sleeve removed.

Similar reference characters designate corresponding parts throughout the several figures of the drawing.

According to the embodiment of the invention shown in the drawing, the same includes in its organization a cell cover designated generally as A and including the top wall having an inner face 1 and an outer face 2, the said wall having a filling opening 3 whose inner edge 4 is flush with the surface of the inner face 1. An upstanding collar 5 surrounds the outer edge of the filling opening 3 and projects outwardly of the face 2 of the top wall of the cover. The interior bore of the collar 5 is provided with one or more longitudinal grooves 6 which serve as keyways, as will presently appear, and the inner end of the bore is provided with an abutment shoulder 7, while the upper end is recessed as at 8 to receive an abutment ring 9. This ring is preferably provided at its outer edge with threads for engaging with corresponding threads in the wall of the recess 8, so that the ring may be readily removed or readily fitted in position in the collar after the electrolyte gauging sleeve designated generally as B is placed in position.

The electrolyte gauging sleeve B is provided near its outer end with an annular or equivalent abutment 10 and the outer side wall of the sleeve is provided with a longitudinal rib or equivalent key 11 for engaging in the groove 6 so that the sleeve is slidably but non-rotatably guided in the collar 5. When the sleeve B is positioned within the bore of the collar 5 and the abutment 9 is in position, it will be seen that the sleeve B may slide or shift within the limits provided by the spaced abutments 7 and 9 within the collar 5.

The sleeve B is preferably internally threaded as at 12 to receive the threaded shank portion 13 of a vented filler cap 14. Rotary movement of the vented cap 14, whose flange rests on the outside end of the collar 5, will control the sliding movement of the sleeve B because of the inter-engaging threads 12 and 13. When the cap 14 is rotated to close the filling opening, as shown in Fig. 1, the sleeve B will be retracted within the collar 5 so that all of the air space beneath the cell cover may freely communicate with the vent of the cap. The lower edge of the sleeve B is retracted to a point at or within the edge 4 of the filling opening 3 so as to leave no projection whatever below the inside face 1 of the cell cover. Thus, no obstruction is offered to the escape of gases or the dissipation of heat from the battery when forming or charging.

When it is desired to fill the battery, the filler cap 14 is turned or rotated so that the shank 13 will propel the sleeve B downwardly before disengaging therefrom. With the sleeve B in its lowered position, the lower edge thereof will form a seal with the electrolyte when the level rises in contact therewith and any additional water placed in the cell will simply rise in the collar 5. When the filler cap 14 is replaced, so that its threaded shank 13 engages the internal threads 12 of the sleeve, and the cap is rotated in the proper direction, the sleeve B will be elevated and retracted completely within the collar 5 and any water in the sleeve will drop down into the electrolyte E in the cell. Also, the air space beneath the cover will be placed in communication with the vented cap.

Due to the common use of automatic vacuum filling machines in most battery making plants, it is necessary and desirable that there be as large an opening as possible to each cell; also in forming batteries in the case, it is necessary that they be overfilled with the forming charge. As previously indicated, this charge must be drained. With the construction of the present invention, the top ring-like abutment 9 and the movable sleeve can be removed during forming and the battery overfilled and easily dumped afterwards. The parts are then readily replaced and the battery filled to the desired level by hand or by automatic devices, as desired. The fact that the sleeve is detachable and no projection is present at the underside of the cover adjacent the filling opening is important from two aspects, first, it insures complete drainage of the forming charge and second, a free and unobstructed path is allowed for escaping gas when the sleeve and cover are interlocked and in normal position, as shown in Fig. 1.

Without further description it is thought that the features and advantages of the invention will be readily apparent to those skilled in the art, and it will, of course, be understood that changes in the form, proportion and minor details of construction may be resorted to, without departing from the spirit of the invention and scope of the appended claims.

I claim:

1. An electric storage battery comprising a cover having an opening the lower end of which is disposed at the highest part of the bottom face of the cover, the bottom face of the cover being formed so that when the battery is inverted all liquid contained therein is free to flow unimpededly to the lower end of said opening, an internally threaded, open-ended sleeve closely fitted in said opening and through which liquid is supplied to and drained from the battery, said sleeve being vertically movable in said opening between a raised position in which its lower end is disposed no lower than the lower end of said opening and a lowered position in which its lower end is disposed below the bottom face of the cover to preclude the possibility of overfilling the battery, means holding said sleeve against rotation relative to the cover, cooperating stop means on the sleeve and cover preventing upward and downward movements of said sleeve beyond its aforesaid raised and lowered positions, a vented cap having a portion to engage a top part of the cover outwardly of said sleeve and also having a depending externally threaded portion for threaded engagement with said sleeve so that when the battery is in an upright position the sleeve is lifted to its raised position when the cap is applied and tightened and is released to gravitate to its lowered position when the cap is removed, said sleeve also being free to gravitate to its first mentioned position when the cap is removed and the battery is inverted so that when the closure cap is removed and the battery is inverted and the sleeve has gravitated to its first mentioned position all liquid contained in the battery is free to drain unimpededly therefrom to the lower end of said opening and the lower open end of said sleeve and through said sleeve from the battery.

2. An electric storage battery comprising a cover including a collar rising from the top thereof, said cover and collar having extending therethrough an opening the lower end of which is disposed at the highest part of the bottom face of the cover, the bottom face of the cover being formed so that when the battery is inverted all liquid contained therein is free to flow unimpededly to the lower end of said opening, an internally threaded, open-ended sleeve closely fitted in said opening and through which liquid is supplied to and drained from the battery, said sleeve being vertically movable in said opening between a raised position in which its lower end is disposed no lower than the lower end of said opening and a lowered position in which its lower end is disposed below the bottom face of the cover to preclude the possibility of overfilling the battery, means holding said sleeve against rotation relative to the cover, a lug on the sleeve and shoulders located adjacent the upper and lower ends of said opening engageable by said lug to prevent upward and downward movements of said sleeve beyond its aforesaid raised and lowered positions and to maintain said sleeve assembled with the cover, a ring in the upper end of said collar constituting the upper shoulder, said ring being threaded in said collar for removal therefrom to permit the sleeve to be inserted in and removed from said collar, a vented cap having a portion to engage the top of said collar outwardly of said sleeve and also having a depending externally threaded portion for threaded engagement with said sleeve so that when the battery is in an upright position the sleeve is lifted to its raised position when the cap is applied and tightened and is released to gravitate to its lowered position when the cap is removed, said sleeve also being free to gravitate to its first mentioned position when the cap is removed and the battery is inverted, so that when the closure cap is removed and the battery is inverted and the sleeve has gravitated to its first mentioned position all liquid contained in the battery is free to drain unimpededly therefrom to the lower end of said opening and the lower open end of said sleeve and through said sleeve from the battery.

GEORGE R. GODBER.